(12) United States Patent
Higuchi

(10) Patent No.: US 8,501,857 B2
(45) Date of Patent: Aug. 6, 2013

(54) ABRASION RESISTANT SILICONE COATING COMPOSITION, COATED ARTICLE, AND MAKING METHOD

(75) Inventor: Koichi Higuchi, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 358 days.

(21) Appl. No.: 12/850,942

(22) Filed: Aug. 5, 2010

(65) Prior Publication Data

US 2011/0034620 A1 Feb. 10, 2011

(30) Foreign Application Priority Data

Aug. 7, 2009 (JP) ................................. 2009-184597

(51) Int. Cl.
*C08K 3/34* (2006.01)
(52) U.S. Cl.
USPC ............ 524/492; 524/588; 524/590; 524/610
(58) Field of Classification Search
USPC .................................. 524/492, 588, 590, 610
See application file for complete search history.

(56) References Cited

U.S. PATENT DOCUMENTS

| | | | |
|---|---|---|---|
| 4,027,073 A | 5/1977 | Clark | |
| 4,371,585 A | 2/1983 | Memon | |
| 4,477,528 A | 10/1984 | Frye | |
| 4,486,504 A | 12/1984 | Chung | |
| 4,668,452 A | 5/1987 | Watanabe et al. | |
| 5,349,002 A | 9/1994 | Patel | |
| 5,411,807 A | 5/1995 | Patel et al. | |
| 5,503,935 A | 4/1996 | Patel | |
| 6,177,138 B1 | 1/2001 | Sawaragi et al. | |
| 6,383,641 B1* | 5/2002 | Kondou et al. | 428/412 |
| 7,157,146 B2 | 1/2007 | Higuchi et al. | |
| 2004/0151457 A1 | 8/2004 | Naruse et al. | |
| 2005/0238879 A1* | 10/2005 | Shoshi et al. | 428/412 |
| 2008/0096029 A1 | 4/2008 | Higuchi et al. | |
| 2008/0280149 A1 | 11/2008 | Higuchi et al. | |

FOREIGN PATENT DOCUMENTS

| | | |
|---|---|---|
| EP | 1 087 001 B1 | 3/2001 |
| JP | 51-2736 | 1/1976 |
| JP | 53-130732 | 11/1978 |
| JP | 60-79071 | 5/1985 |
| JP | 61-56187 | 12/1986 |
| JP | 63-35675 | 7/1988 |
| JP | 63-168470 | 7/1988 |
| JP | 11-293197 | 10/1999 |
| JP | 2001-247769 | 9/2001 |
| JP | 4041968 | 11/2007 |
| JP | 2008-120986 | 5/2008 |
| JP | 2008-274177 | 11/2008 |

OTHER PUBLICATIONS

John-Anthony MacPhee, et al. "Multiparameter Correlation Models. Geometrical and Proximity Site Effects for Carboxylic Acid Esterification and Related Reactions." J. Org. Chem. 1980. 45. 1164-1166.
David P. White, et al. "Computational Measurement of Steric Effects: the Size of Organic Substituents Computed by Ligand Repulsive Energies." J. Org. Chem. 1999. 64. 7707-7716.
Extended European Search Report dated Oct. 6, 2010 in corresponding European Application No. 10 25 1402.

* cited by examiner

*Primary Examiner* — Ling Choi
*Assistant Examiner* — Wenwen Cai
(74) *Attorney, Agent, or Firm* — Oblon, Spivak, McClelland, Maier & Neustadt, L.L.P.

(57) ABSTRACT

A silicone coating composition is provided comprising (A) a hydrolytic condensate obtained by (co)hydrolytic condensation of an alkoxysilane, (B) colloidal silica, (C) a urethane-modified vinyl polymer, (D) a curing catalyst, and (E) a solvent, the solid content of component (C) being 1 to 30% by weight based on the total solid content of components (A) and (B). The silicone coating composition can be coated and cured to an organic resin substrate without a need for primer, and the cured coating is abrasion resistant and transparent to visible light.

17 Claims, No Drawings

ABRASION RESISTANT SILICONE COATING COMPOSITION, COATED ARTICLE, AND MAKING METHOD

CROSS-REFERENCE TO RELATED APPLICATION

This non-provisional application claims priority under 35 U.S.C. §119(a) on Patent Application No. 2009-184597 filed in Japan on Aug. 7, 2009, the entire contents of which are hereby incorporated by reference.

TECHNICAL FIELD

This invention relates to an abrasion resistant silicone coating composition, a coated article, and a method for manufacturing the coated article. More particularly, it relates to an abrasion resistant silicone coating composition which is coated and heat cured onto an organic resin substrate to form a coating having transparency, mar resistance, and long-term adhesion, a coated article having a cured coating of the composition, and a method for manufacturing the coated article.

BACKGROUND ART

Plastic or organic resin substrates are often coated with coating compositions to form a surface protective coating for the purposes of imparting high hardness and mar resistance. Known in the art are coating compositions comprising (partial) hydrolyzates of hydrolyzable organosilanes and coating compositions further comprising colloidal silica.

For example, JP-A S51-002736, JP-A S53-130732, and JP-A S63-168470 disclose coating compositions comprising an organoalkoxysilane, a hydrolyzate of the organoalkoxysilane and/or partial condensate thereof, and colloidal silica, wherein an excess of water is present for converting alkoxy radicals into silanol. In most cases, however, primers must be previously coated onto organic resin substrates in order to help surface protective coatings of these coating compositions firmly adhere to the substrates. The commonly used primers are vinyl polymers in solvent solution. The coatings of these coating compositions have a high hardness and weathering resistance enough to provide good protection for substrates, but are less tough and prone to crack. The coatings lack storage stability in that their hardness decreases with the lapse of time.

Abrasion-resistant silicone coating compositions which can be applied to organic substrates without a need for primers are disclosed in JP-B S63-35675 and JP-A H11-293197. These compositions use polar solvents that can attack the substrates, such as ethyl acetate, 2-butanone and benzyl alcohol.

For the same purpose of substrate attacking, U.S. Pat. No. 4,486,504 and U.S. Pat. No. 5,411,807 propose the addition of (meth)acrylic acid or hydroxyl-containing esters thereof.

Merely adding such substrate-attacking solvents or compounds is effective in improving initial adhesion, but insufficient in achieving long-term or wet adhesion. Another problem of these techniques is that the substrate can be whitened when an excess of the substrate-attacking compound is added for the purpose of improving adhesion.

The addition of an adhesion promoter is another approach for the abrasion-resistant silicone coating compositions which can be applied to organic substrates without a need for primers. The adhesion promoters proposed thus far include binders having phenyltrihydroxysilane incorporated therein (JP-A S60-79071) and (meth)acrylated polyurethane, reactive radical-containing acrylic copolymers, and caprolactone based polyester polyols (JP-A 2001-247769, U.S. Pat. No. 5,503,935, and U.S. Pat. No. 5,349,002). The use of such adhesion promoters are still insufficient in adhesion to resin substrates, especially long-term adhesion.

Although many attempts were made to improve the adhesion of abrasion-resistant silicone coating compositions to organic resin substrates as discussed above, none are fully satisfactory. There is a strong desire to have a coating composition for forming a cured coating which exhibits mar resistance and long-term substrate adhesion while maintaining transparency.

CITATION LIST

Patent Document 1: JP-A S51-002736
Patent Document 2: JP-A S53-130732
Patent Document 3: JP-A S63-168470
Patent Document 4: JP-B S63-035675
Patent Document 5: JP-A H11-293197
Patent Document 6: U.S. Pat. No. 4,486,504
Patent Document 7: U.S. Pat. No. 5,411,807
Patent Document 8: JP-A S60-079071
Patent Document 9: JP-A 2001-247769
Patent Document 10: U.S. Pat. No. 5,503,935
Patent Document 11: U.S. Pat. No. 5,349,002

SUMMARY OF INVENTION

An object of the invention is to provide an abrasion resistant silicone coating composition which can be applied directly to an organic resin substrate without priming and cured into a coating which exhibits mar resistance and long-term substrate adhesion while maintaining transparency. Another object is to provide an article coated with the composition.

The inventors have found that an abrasion resistant silicone coating composition is improved by incorporating a polycarbonate and/or polyester base urethane-modified vinyl polymer as the adhesion promoter, that the resulting silicone coating composition can be applied and cured to an organic resin substrate without priming, and that the cured coating exhibits mar resistance while remaining transparent, and maintains long-term adhesion which has not been otherwise accomplished.

In one aspect, the invention provides an abrasion resistant silicone coating composition comprising
(A) a hydrolytic condensate obtained by (co)hydrolytic condensation of at least one compound selected from alkoxysilanes having the general formula (1) and partial hydrolytic condensates thereof, $$R^1_m R^2_n Si(OR^3)_{4-m-n} \quad (1)$$

wherein $R^1$ and $R^2$ are each independently hydrogen or a substituted or unsubstituted monovalent hydrocarbon radical, the radicals of $R^1$ and $R^2$ may bond together, $R^3$ is an alkyl radical of 1 to 3 carbon atoms, m and n are each independently 0 or 1, and m+n is 0, 1 or 2,
(B) colloidal silica,
(C) a polycarbonate and/or polyester base urethane-modified vinyl polymer,
(D) a curing catalyst, and
(E) a solvent, wherein
the urethane-modified vinyl polymer (C) is present in a solid content of 1 to 30% by weight based on the total solid content of the hydrolytic condensate (A) and the colloidal silica (B).

In a preferred embodiment, component (C) is a polycarbonate base urethane-modified vinyl polymer. Preferably the urethane-modified vinyl polymer (C) has a weight average molecular weight of 5,000 to 50,000 as measured by GPC versus polystyrene standards. Also preferably, the urethane-modified vinyl polymer (C) has a hydroxyl number of at least 10. Also preferably, the urethane-modified vinyl polymer (C) is a vinyl polymer having as a pendant a polycarbonate base urethane obtained from reaction of an aliphatic polycarbonate diol with an aromatic diisocyanate.

In another preferred embodiment, the hydrolytic condensate (A) is obtained by subjecting 100 parts by weight of at least one compound selected from alkoxysilanes of formula (1) and partial hydrolytic condensates thereof to (co)hydrolytic condensation with 50 to less than 150 parts by weight of water at pH 1 to 7, to form a hydrolytic condensate and an alcohol, and distilling off the alcohol at a liquid temperature of at least 80° C., and has a weight average molecular weight of at least 1,500 as measured by GPC versus polystyrene standards.

In a preferred embodiment, component (A) further contains (A-1) 1 to 50% by weight of a siloxane resin having the average compositional formula (2):

wherein $R^4$ is each independently a $C_1$-$C_{18}$ organic radical, $R^5$ is each independently a $C_1$-$C_4$ organic radical, a, b and c are numbers satisfying $0.8 \leq a \leq 1.5$, $0 \leq b \leq 0.3$, $0.001 \leq c \leq 0.5$, and $0.801 \leq a+b+c<2$, the siloxane resin being solid at a temperature of up to 40° C. and having a weight average molecular weight of at least 2,000 as measured by GPC.

In a preferred embodiment, the solvent (E) is present in such an amount that the composition may have a solid concentration of 1 to 30% by weight.

The composition may further comprise (F) a UV absorber.

In another aspect, the invention provides a coated article comprising an organic resin substrate and a cured coating of the silicone coating composition disposed on at least one surface of the substrate directly or via at least one intermediate layer. Preferably the cured coating of the composition is directly disposed on at least one surface of the substrate. Typically the organic resin substrate is a polycarbonate.

In a further aspect, the invention provides a method for manufacturing a coated article comprising the steps of coating the silicone coating composition of any one of claims 1 to 9 onto an organic resin substrate directly without a primer, and curing the composition.

Advantageous Effects of Invention

The silicone coating composition of the invention can be applied and cured to an organic resin substrate without priming. The cured coating is transparent and mar resistant and maintains long-term adhesion which has long been desired.

DESCRIPTION OF EMBODIMENTS

The singular forms "a," "an" and "the" include plural referents unless the context clearly dictates otherwise. As used herein, the notation ($C_n$-$C_m$) means a group containing from n to m carbon atoms per group. As used herein, the term "film" is used interchangeably with "coating" or "layer." Mw and Mn stand for weight and number average molecular weights, respectively, which are determined by gel permeation chromatography (GPC) versus polystyrene standards, unless otherwise stated. Mw/Mn stands for a molecular weight distribution or polydispersity index.

Now the respective components of the abrasion resistant silicone coating composition are described.

Component A

Component (A) is a hydrolytic condensate obtained by (co)hydrolytic condensation of at least one compound selected from alkoxysilane compounds having the general formula (1) and partial hydrolytic condensates thereof.

Herein $R^1$ and $R^2$ are each independently hydrogen or a substituted or unsubstituted monovalent hydrocarbon radical, the radicals of $R^1$ and $R^2$ may bond together, $R^3$ is an alkyl radical of 1 to 3 carbon atoms, m and n are each independently 0 or 1, and m+n is 0, 1 or 2.

Specifically, $R^1$ and $R^2$ are each independently selected from hydrogen and substituted or unsubstituted monovalent hydrocarbon radicals, preferably of 1 to 12 carbon atoms, more preferably 1 to 8 carbon atoms. Examples include hydrogen; alkyl radicals such as methyl, ethyl, propyl, butyl, pentyl, hexyl, heptyl, and octyl; cycloalkyl radicals such as cyclopentyl and cyclohexyl; alkenyl radicals such as vinyl and allyl; aryl radicals such as phenyl; halogenated hydrocarbon radicals such as chloromethyl, γ-chloropropyl, and 3,3', 3"-trifluoropropyl; and (meth)acryloxy, epoxy, mercapto, amino or isocyanate-substituted hydrocarbon radicals such as γ-methacryloxypropyl, γ-glycidodypropyl, 3,4-epoxycyclohexylethyl, γ-mercaptopropyl, γ-aminopropyl, and γ-isocyanatopropyl. Also included is an isocyanurate radical that is formed by combining isocyanate-substituted hydrocarbon radicals together. Of these, alkyl radicals are preferred for use in the application where mar resistance and weather resistance are required, and epoxy, (meth)acryloxy, and isocyanate-substituted hydrocarbon radicals are preferred where toughness and dyeability are required.

$R^3$ is an alkyl radical of 1 to 3 carbon atoms, such as methyl, ethyl, n-propyl, or i-propyl. Of these, methyl and ethyl are preferred because a corresponding compound is susceptible to hydrolytic condensation and the alcohol $R^3OH$ formed by hydrolysis has a high vapor pressure and is easy to distill off.

Those alkoxysilane compounds of formula (1) wherein m=n=0 are (a-1) tetraalkoxysilanes of the formula: $Si(OR^3)_4$ or partial hydrolytic condensates thereof. Examples of such tetraalkoxysilanes or partial hydrolytic condensates thereof include tetramethoxysilane, tetraethoxysilane, tetraisopropoxysilane, tetrabutoxysilane, partial hydrolytic condensates of tetramethoxysilane, commercially available under the trade name of M Silicate 51 from Tama Chemicals Co., Ltd., MSI 51 from Colcoat Co., Ltd., MS51 and MS56 from Mitsubishi Chemical Corp., partial hydrolytic condensates of tetraethoxysilane, commercially available under the trade name of Silicate 35 and Silicate 45 from Tama Chemicals Co., Ltd., ESI 40 and ESI 48 from Colcoat Co., Ltd., and partial cohydrolytic condensates of tetramethoxysilane and tetraethoxysilane, commercially available under the trade name of FR-3 from Tama Chemicals Co., Ltd., and EMSi 48 from Colcoat Co., Ltd.

Those alkoxysilane compounds of formula (1) wherein m=1 and n=0, or m=0 and n=1 are (a-2) trialkoxysilanes of the formula: $R^1Si(OR^3)_3$ or $R^2Si(OR^3)_3$ or partial hydrolytic condensates thereof. Examples of such trialkoxysilanes or partial hydrolytic condensates thereof include hydrogentrimethoxysilane, hydrogentriethoxysilane, methyltrimethoxysilane, methyltriethoxysilane, methylitriisopropoxysilane, ethyltrimethoxysilane, ethyltriethoxysilane, ethyltriisopropoxysilane, propyltrimethoxysilane, propyltriethoxysilane, propyltriisopropoxysilane, phenyltrimethoxysilane, vinyltrimethoxysilane, allyltrimethoxysilane, γ-methacryloxypropyltrimethoxysilane, γ-methacryloxypropyltriethoxysilane, γ-acryloxypropyltrimethoxysilane, γ-glycidoxypropyltrimethoxysilane, γ-glycidoxypropyltriethoxysilane, β-(3,4-epoxycyclohexyl)ethyltrimethoxysilane, γ-chloropropyltrimethoxysilane, 3,3,3-trifluoropropyltrimethoxysilane, 3,3,3-trifluoropropyltriethoxysilane, perfluorooctylethyltrimethoxysilane, γ-mercaptopropyltrimethoxysilane, γ-aminopropyltrimethoxysilane, γ-aminopropyltriethoxysilane, N-(2-aminoethyl)aminopropyltrimethoxysilane, γ-isocyanatopropyltrimethoxysilane, γ-isocyanatopropyltriethoxysilane, tris(3-trimethoxysilylpropyl)isocyanurate and tris(3-triethoxysilylpropyl)isocyanurate in which isocyanate radicals bond together, 4-trimethoxysilylpropyloxy-2-hydroxybenzophenone, partial hydrolytic condensates of methyltrimethoxysilane, commercially available under the trade name of KC-89S and X-40-9220 from Shin-Etsu Chemical Co., Ltd., and partial hydrolytic condensates of methyltrimethoxysilane and γ-glycidoxypropyltrimethoxysilane, commercially available under the trade name of X-41-1056 from Shin-Etsu Chemical Co., Ltd.

Those alkoxysilane compounds of formula (1) wherein m=n=1 are (a-3) dialkoxysilanes of the formula: $R^1R^2Si(OR^3)_2$ or partial hydrolytic condensates thereof. Examples of such dialkoxysilanes or partial hydrolytic condensates thereof include methylhydrogendimethoxysilane, methylhydrogendiethoxysilane, dimethyldimethoxysilane, dimethyldiethoxysilane, methylethyldimethoxysilane, diethyldimethoxysilane, diethyldiethoxysilane, methylpropyldimethoxysilane, methylpropyldiethoxysilane, diisopropyldimethoxysilane, phenylmethyldimethoxysilane, vinylmethyldimethoxysilane, γ-glycidoxypropylmethyldimethoxysilane, γ-glycidoxypropylmethyldiethoxysilane, β-(3,4-epoxycyclohexyl)ethylmethyldimethoxysilane, γ-methacryloxypropylmethyldimethoxysilane, γ-methacryloxypropylmethyldiethoxysilane, γ-mercaptopropylmethyldimethoxysilane, γ-aminopropylmethyldiethoxysilane, and N-(2-aminoethyl)aminopropylmethyldimethoxysilane.

The hydrolytic condensate as component (A) may be prepared using the foregoing components (a-1), (a-2) and (a-3) in any desired proportion. For the purpose of improving storage stability, mar resistance and crack resistance, it is preferred to use 0 to 50 Si-mol % of component (a-1), 50 to 100 Si-mol % of component (a-2) and 0 to 10 Si-mol % of component (a-3), based on the total amount of components (a-1), (a-2) and (a-3) which is equal to 100 Si-mol %. It is more preferred to use 0 to 30 Si-mol % of component (a-1), 70 to 100 Si-mol % of component (a-2) and 0 to 10 Si-mol % of component (a-3). If the main component (a-2) is less than 50 Si-mol %, the resin may have a lower crosslinking density and less curability, tending to form a cured film with a lower hardness. If component (a-1) is in excess of 50 Si-mol %, the resin may have a higher crosslinking density and a lower toughness, permitting crack formation.

It is noted that Si-mol % is a percentage based on the total Si moles, and the Si mole means that in the case of a monomer, its molecular weight is 1 mole, and in the case of a dimer, its average molecular weight divided by 2 is 1 mole.

The hydrolytic condensate as component (A) may be prepared through (co)hydrolytic condensation of components (a-1), (a-2) and (a-3) by a well-known method. For example, an alkoxysilane (a-1), (a-2) or (a-3) or partial hydrolytic condensate thereof or a mixture thereof is (co)hydrolyzed in water at pH 1 to 7, preferably pH 2 to 7. At this point, metal oxide nanoparticles dispersed in water such as silica sol may be used. A catalyst may be added to the system for adjusting its pH to the described range and to promote hydrolysis. Suitable catalysts include organic acids and inorganic acids such as hydrogen fluoride, hydrochloric acid, nitric acid, formic acid, acetic acid, propionic acid, oxalic acid, citric acid, maleic acid, benzoic acid, malonic acid, glutaric acid, glycolic acid, methanesulfonic acid, and toluenesulfonic acid, solid acid catalysts such as cation exchange resins having carboxylic or sulfonic acid groups on the surface, and water-dispersed metal oxide nanoparticles such as acidic water-dispersed colloidal silica to be described later. Alternatively, a dispersion of metal oxide nanoparticles in water or organic solvent such as colloidal silica may be co-present upon hydrolysis.

In this hydrolysis, water may be used in an amount of 20 to 3,000 parts by weight relative to 100 parts by weight of the total of alkoxysilanes (a-1), (a-2) and (a-3) and/or partial hydrolytic condensates thereof. An excess of water may lower system efficiency and in a final coating composition, residual water can adversely affect coating operation and drying. Water is preferably used in an amount of 50 parts by weight to less than 150 parts by weight, more preferably 50 parts by weight to less than 100 parts by weight for the purpose of improving storage stability, mar resistance, and crack resistance. With a smaller amount of water, the hydrolytic condensate may fail to reach a weight average molecular weight in the optimum range, as measured by GPC versus polystyrene standards. With an excess of water, the content in the hydrolytic condensate of units $R'SiO_{3/2}$ in units $R'SiO_{(3-p)/2}(OX)_p$ derived from component (a-2) may fail to reach the optimum range to maintain a coating crack resistant wherein R' is $R^1$ or $R^2$, X is hydrogen or $R^3$, $R^1$, $R^2$, and $R^3$ are as defined above, and p is an integer of 0 to 3.

Hydrolysis may be effected by adding dropwise or pouring water to the alkoxysilane or partial hydrolytic condensate, or inversely by adding dropwise or pouring the alkoxysilane or partial hydrolytic condensate to water. The reaction system may contain an organic solvent. However, the absence of organic solvent is preferred because there is a tendency that as the reaction system contains more organic solvent, the resulting hydrolytic condensate has a lower weight average molecular weight as measured by GPC versus polystyrene standards.

To produce the hydrolytic condensate (A), the hydrolysis must be followed by condensation. Condensation may be effected continuous to the hydrolysis while maintaining the liquid temperature at room temperature or heating at a temperature of not higher than 100° C. A temperature higher than 100° C. may cause gelation. Condensation may be promoted by distilling off the alcohol formed by hydrolysis at a temperature of at least 80° C. and atmospheric or subatmospheric pressure. Also for the purpose of promoting condensation, condensation catalysts such as basic compounds, acidic compounds or metal chelates may be added. Prior to or during the condensation step, an organic solvent may be added for the purpose of adjusting the progress of condensation and the concentration, or a dispersion of metal oxide nanoparticles in water or organic solvent such as colloidal silica to be described later may also be added. For the reason that a hydrolytic condensate generally builds up its molecular weight and reduces its solubility in water or alcohol formed as condensation proceeds, the organic solvent added herein should preferably be one having a boiling point of at least 80° C. and a relatively high polarity in which the hydrolytic condensate is fully dissolvable. Examples of the organic solvent include alcohols such as isopropyl alcohol, n-butanol, isobutanol, t-butanol, and diacetone alcohol; ketones such as methyl propyl ketone, diethyl ketone, methyl isobutyl ketone, cyclohexanone, and diacetone alcohol; ethers such as dipropyl ether, dibutyl ether, anisole, dioxane, ethylene glycol monoethyl ether, ethylene glycol monobutyl ether, propylene glycol monomethyl ether, and propylene glycol monomethyl ether acetate; and esters such as propyl acetate, butyl acetate, and cyclohexyl acetate.

The hydrolytic condensate resulting from condensation should preferably have a weight average molecular weight (Mw) of at least 1,500, more preferably 1,500 to 50,000, and even more preferably 2,000 to 20,000, as measured by GPC versus polystyrene standards. With a Mw below the range, a coating tends to lose toughness and become prone to crack. On the other hand, a resin with too high a Mw tends to have a low hardness and the resin in a coating may undergo phase separation, incurring film whitening.

In a preferred embodiment, component (A) contains (A-1) a siloxane resin having the average compositional formula (2).

$$R^4{}_a Si(OR^5)_b(OH)_c O_{(4-a-b-c)/2} \quad (2)$$

Herein $R^4$ is each independently a $C_1$-$C_{18}$ organic radical, $R^5$ is each independently a $C_1$-$C_4$ organic radical, a, b and c are numbers satisfying $0.8 \leq a \leq 1.5$, $0 \leq b \leq 0.3$, $0.001 \leq c \leq 0.5$, and $0.801 \leq a+b+c < 2$. The siloxane resin should be solid at a temperature of up to 40° C. and have a weight average molecular weight of at least 2,000, preferably 2,000 to 10,000 as measured by GPC versus polystyrene standards. Inclusion of siloxane resin (A-1) is effective in rendering a hard coat film flexible to prevent cracks or the like while maintaining a high hardness. This effect is exerted because component (A-1) contains a relatively small amount of terminal radicals ($OR^5$ and OH), participates in crosslinking reaction of the hard coat composition only in a limited manner, and plays the role of a buffer for bridging voids in the crosslinked network. If the amount of terminal radicals is too small, component (A-1) may not be firmly fixed in the film, which may be detrimental to solvent resistance or other properties. Thus component (A-1) contains terminal radicals in a relatively small amount, but enough to form bonds between components (A) and (B) so limitedly that component (A-1) may be fixed in the hard coat film.

Inclusion of component (A-1) is also effective in altering the surface state of a hard coat film. The cured hard coat film exhibits a phenomenon that its surface is repellent to commercial marker ink, for example.

In formula (2), $R^4$ is each independently an organic radical of 1 to 18 carbon atoms, preferably 1 to 10 carbon atoms. Exemplary organic radicals are substituted or unsubstituted monovalent hydrocarbon radicals, for example, alkyl, aryl, aralkyl, alkenyl and halo-substituted alkyl radicals, with the alkyl and aryl radicals being preferred. Examples include methyl, ethyl, propyl, butyl, hexyl, octyl, decyl, cyclopentyl, cyclohexyl, phenyl, vinyl and trifluoropropyl.

$R^5$ is each independently a $C_1$-$C_4$ organic radical, typically alkyl or alkenyl. $OR^5$ represents the terminal radical on a siloxane resin other than the silanol radical (Si—OH). Exemplary of $OR^5$ are methoxy, ethoxy, propoxy and butoxy. Inter alia, methoxy and ethoxy are preferred because starting reactants are readily available.

The subscripts a, b and c are numbers satisfying $0.8 \leq a \leq 1.5$, $0 \leq b \leq 0.3$, $0.001 \leq c \leq 0.5$, and $0.801 \leq a+b+c < 2$. If the content (a) of $R^4$ is less than 0.8, crack resistance is low. If the content (a) of $R^4$ is more than 1.5, then a siloxane resin has an increased content of organic radicals and higher hydrophobic property, may become less compatible with the hard coat film and bleed out of the film, resulting in the hard coat film losing the crack prevention effect and having appearance defects such as cissing.

If the content (b) of $OR^5$ is more than 0.3, then a siloxane resin has an increased content of terminal radicals which may participate more in the condensation reaction between components (A) and (B), failing in the crack prevention effect. These alkoxy radicals may be quantitatively determined by infrared (IR) absorption spectroscopy or the alcohol determination method based on alkali cracking.

If the content (c) of OH is more than 0.5, then a siloxane resin may participate more in the condensation reaction between components (A) and (B) upon heat curing, resulting in poor crack resistance despite a high hardness. If the content (c) of OH is less than 0.001, then a siloxane resin may form no bonds with components (A) and (B) and may not be fixed within the film, leading to drops of hardness and solvent resistance.

More preferably, a, b and c are in the range: $0.9 \leq a \leq 1.3$, $0.001 \leq b \leq 0.2$, $0.01 \leq c \leq 0.3$, and $0.911 \leq a+b+c \leq 1.8$.

Values of a, b and c may be determined by analyzing a resin by $^{29}$Si-NMR spectroscopy and computing an average chemical structure thereof. For example, T units ($RSiO_{3/2}$) synthesized from a trifunctional hydrolyzable silane include the following four structural units (T0 to T3):

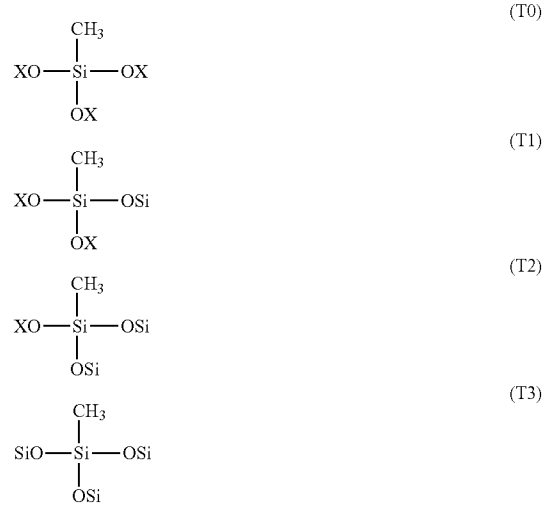

wherein X is hydrogen or $R^5$. In the $^{29}$Si-NMR spectrum, signals assigned to these structural units are observed at different chemical shifts. Since the areas of these signals represent the fractions of the structures incorporated, the structure of a siloxane resin may be computed from the fractions and the amount of residual alkoxy radicals as determined by IR spectroscopy.

The siloxane resin as component (A-1) is solid at a temperature of up to 40° C. If a siloxane resin is liquid at or below 40° C., a coating may become low in hardness and solvent resistance even when the siloxane resin forms bonds with components (A) and (B) upon heat curing. The siloxane resin as component (A-1) preferably has a volatile matter of up to 2% by weight when dried at 105° C. for 3 hours. With a volatile content in excess of 2% by weight, the siloxane resin in solid form may flow or fuse even at or below 40° C., detracting from ease of working.

The siloxane resin as component (A-1) has a weight average molecular weight (Mw) of at least 2,000, preferably 2,000 to 10,000 as measured by GPC versus polystyrene standards. A siloxane resin with Mw of less than 2,000 may contain much terminal radicals which participate in crosslinking, failing in crack prevention. A siloxane resin with too high Mw may be less compatible with components (A) and (B), resulting in an opaque film.

Preferably the siloxane resin has a softening point of 60 to 90° C. With a softening point of lower than 60° C., a hard coat film may have a low hardness and abrasion resistance. A siloxane resin with a softening point of higher than 90° C. may be less compatible with components (A) and (B), resulting in poor crack resistance. Notably, the softening point is measured by the ring and ball method according to JIS K-2207.

The siloxane resin may be generally represented by a combination of Q units ($SiO_{4/2}$) derived from tetrafunctional silane, T units ($R^6SiO_{3/2}$) derived from trifunctional silane, D units ($R^6SiO_{2/2}$) derived from difunctional silane, and M units ($R^6SiO_{1/2}$) derived from monofunctional silane. When component (A-1) is expressed by this notation, desirably a molar proportion of T units ($R^6SiO_{3/2}$) is desirably at least 70 mol %, based on the total moles of entire siloxane units. If the proportion of T units is less than 70 mol %, an overall profile of hardness, abrasion resistance, adhesion, applicability and appearance may be compromised. It is noted that the balance may consist of M, D and Q units, the sum of these units being desirably up to 30 mol %.

In siloxane units ($R^6SiO_{3/2}$), $R^6$ is each independently a $C_1$-$C_{18}$ organic radical, and preferably at least 80 mol % of $R^6$ is a $C_1$-$C_6$ organic radical. While any of the radicals exemplified for $R^4$ may be applicable to $R^6$, it is preferred that at least 80 mol % of $R^6$ be a $C_1$-$C_6$ monovalent hydrocarbon radical, especially alkyl. Of the $C_1$-$C_6$ monovalent hydrocarbon radicals, methyl, ethyl, propyl, butyl, pentyl, hexyl, cyclopentyl and cyclohexyl are preferred from the standpoints of hardness, abrasion resistance, adhesion, and compatibility, with methyl, ethyl and propyl being more preferred.

Were the siloxane resin as component (A-1) is compounded, an organic solvent solution of the siloxane resin may be previously prepared prior to mixing with other components. This is convenient because heat is sometimes necessary in dissolving the siloxane resin in a solvent. Preferred solvents include ethanol, isopropanol, isobutanol, propylene glycol monoalkyl ethers, and diacetone alcohol, but are not limited thereto.

The siloxane resin as component (A-1) may be prepared by any well-known resin production methods. One exemplary resin production method is by providing at least one hydrolyzable silane compound or a mixture of the hydrolyzable silane compound and an organic solvent, adding water thereto, stirring the contents to bring the hydrolyzable silane compound in contact with water to effect hydrolytic reaction, the hydrolytic reaction releasing silanol radicals, further reacting such silanol radicals with each other or with another hydrolyzable radical to form a siloxane linkage (—Si—O—Si—) for effecting polycondensation. The polymerization is followed by neutralization and final removal of the organic solvent, yielding a siloxane resin in solid form. Unlike solvent-insoluble gel, this solid resin is dissolvable in an organic solvent again. The resin production method which is advantageous in the production of a siloxane resin for use as component (A-1) favors hydrolysis under strong acid conditions (especially below pH 2). Under strong acid conditions, silanol radicals contributing to polycondensation reaction become more labile than under weak acid conditions, so that reactions rapidly proceed in succession to form a polymer.

The amount of water used in hydrolysis varies with the type of hydrolyzable radical on a silane reactant. When the reactant is an alkoxysilane, the amount of water is preferably less than 1.5 moles, more preferably 0.6 to 1.0 mole per mole of the hydrolyzable radical X. If the amount of water for hydrolysis is at least 1.5 moles during polycondensation reaction under strong acid conditions, undesirably three-dimensional condensation takes place rapidly to invite gelation. When the reactant is a chlorosilane, the amount of water for hydrolysis is not critical.

For hydrolysis, an organic solvent may be used. Non-polar solvents having a low solubility in water are preferred. Specifically hydrocarbon solvents such as toluene, xylene and hexane are preferred in most cases although they may be used in combination with polar solvents such as alcohols because hydrolysis reaction takes place slowly if the solvent is less miscible with water. The starting reactant, hydrolyzable silane may be any of the silane compounds of formula (1). Examples include vinyltrichlorosilane, vinyltrimethoxysilane, vinyltriethoxysilane, vinylmethyldichlorosilane, vinylmethyldimethoxysilane, vinylmethyldiethoxysilane, tetrachlorosilane, tetramethoxysilane, tetraethoxysilane, methyltrichlorosilane, methyltrimethoxysilane, dimethyldimethoxysilane, methyltriethoxysilane, methyltriisopropoxysilane, propyltrichlorosilane, propyltrimethoxysilane, propyltriethoxysilane, hexyltrichlorosilane, hexyltrimethoxysilane, phenyltrichlorosilane, phenyltrimethoxysilane, and diphenyldimethoxysilane. Inter alia, vinyltrimethoxysilane, vinyltriethoxysilane, methyltrimethoxysilane, dimethyldimethoxysilane, and phenyltrimethoxysilane are preferred.

Component (A-1) is preferably present in an amount of 1 to 50% by weight, more preferably 2 to 35%, and even more preferably 3 to 20% by weight based on the weight of component (A). A too higher proportion of component (A-1) may lead to a hard coat film having a low hardness and abrasion resistance.

Component B

Component (B) is colloidal silica. Silica particles are believed to play both the role of a filler for imparting hardness and mar resistance to a film and the role of a crosslinker for bonding with silanol radicals in component (A) as a binder at particle surfaces. More specifically, silica particles as component (B) have on their surfaces silanol radicals (Si—OH) which are capable of forming linkages (Si—O—Si) with component (A). The colloidal silica which can be used as component (B) is of a small particle size enough to maintain the coating transparent. Preferred is nanoparticle silica having a particle size of 5 to 50 nm. The colloidal silica is generally a colloidal dispersion in a medium such as water or organic solvents. Any of commercially available water-dispersed and organic solvent-dispersed colloidal silica is useful. Examples include Snowtex-O, OS, OL and Methanol Silica Sol (by Nissan Chemical Industries, Ltd.). Colloidal silica is preferably added in an amount of 1 to 200%, more preferably 5 to 100%, and even more preferably 5 to 50% by weight based on the solid weight of the hydrolytic condensate as component (A).

Component C

Component (C) which serves as an adhesion promoter is a polycarbonate and/or polyester base urethane-modified vinyl polymer. It is believed that component (C) segregates or delaminates from the silicone binder as component (A) in the cured film to provide a graded concentration in the thickness direction of the cured film, thereby providing the cured film with a better affinity to an organic resin substrate without a loss of anti-marring performance. Better adhesion is developed in this way. The polycarbonate and/or polyester base urethane-modified vinyl polymer as component (C) is a vinyl polymer having a polycarbonate or polyester base polyurethane grafted thereto. Preferred are vinyl polymers having as a pendant a polycarbonate or polyester base urethane obtained from reaction of an aliphatic polycarbonate diol or aliphatic polyester diol with an aromatic diisocyanate. More preferred is a vinyl polymer having as a pendant a polycarbonate base urethane obtained from reaction of an aliphatic polycarbonate diol with an aromatic diisocyanate.

Suitable aliphatic polycarbonate diols include 1,4-tetramethylene, 1,5-pentamethylene, 1,6-hexamethylene, 1,12-dodecane, and 1,4-cyclohexane forms, and mixtures thereof. Suitable aromatic diisocyanates include 4,4'-diphenylmethane diisocyanate, 2,4-tolylene diisocyanate, 2,6-tolylene diisocyanate, m-xylene diisocyanate, and naphthalene diisocyanate, and mixtures thereof. By reacting these reactants in a standard way, a polycarbonate base polyurethane may be prepared.

The vinyl polymer may be constructed from any of monomers having a vinyl polymerizable radical. Suitable monomers include methyl (meth)acrylate, ethyl (meth)acrylate, butyl (meth)acrylate, cyclohexyl (meth)acrylate, glycidyl (meth)acrylate, 2-hydroxyethyl (meth)acrylate, (meth)acrylic acid, styrene, and vinyl acetate. A vinyl polymer may be prepared by polymerizing such monomers in a standard way.

The urethane-modified vinyl polymer as component (C) is preferably used in organic solvent solution for ease of synthesis and ease of handling. Preferred are organic solvents having a relatively high polarity in which the urethane-modified vinyl polymer is fully dissolvable. Suitable organic solvents include alcohols such as isopropyl alcohol, n-butanol, isobutanol, t-butanol and diacetone alcohol; ketones such as methyl ethyl ketone, diethyl ketone, methyl isobutyl ketone, cyclohexanone, and diacetone alcohol; ethers such as dipropyl ether, dibutyl ether, anisole, dioxane, ethylene glycol monoethyl ether, ethylene glycol monobutyl ether, propylene glycol monomethyl ether, and propylene glycol monomethyl ether acetate; and esters such as ethyl acetate, propyl acetate, butyl acetate, and cyclohexyl acetate.

The polycarbonate and/or polyester base urethane-modified vinyl polymer as component (C) preferably has a weight average molecular weight (Mw) of 5,000 to 50,000, more preferably 7,000 to 40,000, as measured by GPC versus polystyrene standards. A modified vinyl polymer with a Mw of less than 5,000 may fail to provide adhesion to the organic resin substrate. A modified vinyl polymer with a Mw in excess of 50,000 may have a low solubility in the composition, become separated therefrom, and detract from the transparency of a cured coating.

Preferably the urethane-modified vinyl polymer as component (C) has a hydroxyl number of at least 10, more preferably 20 to 100, calculated as solids of the urethane-modified vinyl polymer. A urethane-modified vinyl polymer with a hydroxyl number of less than 10 may have a low solubility in the composition and become separated therefrom.

The urethane-modified vinyl polymer as component (C) is commercially available. Examples include Acrit 8UA-347, 357 and 366 (polycarbonate base) and Acrit 8UA-140, 146, 301 and 318 (polyester base) by Taisei Fine Chemical Co., Ltd.

The urethane-modified vinyl polymer as component (C) may be compounded in an amount of 1 to 30% by weight as solids based on the total solid weight of components (A) and (B). An amount of 3 to 25 wt % as solids is more preferred. If the amount of component (C) is less than 1 wt %, no improvement may be made in adhesion to the organic resin substrate. More than 30 wt % of component (C) may adversely affect mar resistance.

Component D

Component (D) is a curing catalyst which may be selected from those catalysts commonly used in silicone coating compositions. The curing catalyst serves to promote condensation reaction of condensable groups such as silanol and alkoxy groups in the hydrolytic condensate (A). Suitable catalysts include basic compounds such as lithium hydroxide, sodium hydroxide, potassium hydroxide, sodium methylate, sodium propionate, potassium propionate, sodium acetate, potassium acetate, sodium formate, potassium formate, trimethylbenzylammonium hydroxide, tetramethylammonium hydroxide, tetramethylammonium acetate, n-hexylamine, tributylamine, diazabicycloundecene (DBU), and dicyandiamide; metal-containing compounds such as tetraisopropyl titanate, tetrabutyl titanate, acetylacetonatotitanium, aluminum triisobutoxide, aluminum triisopropoxide, tris(acetylacetonato)aluminum, aluminum diisopropoxy(ethyl acetoacetate), aluminum perchlorate, aluminum chloride, cobalt octylate, (acetylacetonato)cobalt, (acetylacetonato)iron, (acetylacetonato)tin, dibutyltin octylate, and dibutyltin laurate; and acidic compounds such as p-toluenesulfonic acid and trichloroacetic acid. Of these, preference is given to sodium propionate, sodium acetate, sodium formate, trimethylbenzylammonium hydroxide, tetramethylammonium hydroxide, tris(acetylacetonato)aluminum, and aluminum diisopropoxy(ethyl acetoacetate).

Another useful curing catalyst is an aromatic-free compound having the general formula (3). The silicone coating composition loaded with this catalyst becomes shelf stable while remaining curable and crack resistant.

$$[R^6R^7R^8R^9M]^+ \cdot X^- \tag{3}$$

Herein $R^6$, $R^7$, $R^8$ and $R^9$ are each independently a $C_1$-$C_{18}$ alkyl group which may be substituted with halogen, each of $R^6$, $R^7$, $R^8$ and $R^9$ has a Taft-Dubois steric substituent constant Es, the total of constants Es of $R^6$, $R^7$, $R^8$ and $R^9$ is up to −0.5, M is an ammonium or phosphonium cation, and $X^-$ is a halide anion, hydroxide anion or $C_1$-$C_4$ carboxylate anion.

Taft-Dubois steric substituent constant Es is a rate of esterification reaction of a substituted carboxylic acid under acidic conditions relative to methyl group $CH_3$ and represented by the equation:

$$Es = \log(k/k0)$$

wherein k is a rate of acidic esterification reaction of a substituted carboxylic acid under specific conditions and k0 is a rate of acidic esterification reaction of methyl-substituted carboxylic acid under the same conditions. See J. Org. Chem., 45, 1164 (1980) and J. Org. Chem., 64, 7707 (1999). In general, Taft-Dubois steric substituent constant Es is an index representing the steric bulkiness of a substituent. For example, the value of constant Es is 0.00 for methyl, −0.08 for ethyl, −0.31 for n-propyl, and −0.31 for n-butyl, indicating that the lower (or more negative) the Es, the more sterically bulky is the substituent.

In formula (3), the total of constants Es of $R^6$, $R^7$, $R^8$ and $R^9$ should be equal to or more negative than −0.5. If the total of constants Es is above −0.5, a coating composition becomes low in shelf stability and forms a coat which can be cracked or whitened in a water-resistant test and loses adhesion, especially wet adhesion and boiling adhesion. In the event the total of constants Es is above −0.5, for example, $R^6$, $R^7$, $R^8$ and $R^9$ are all methyl, a corresponding catalyst of formula (3) becomes higher in catalytic activity, but a coating composition comprising the same tends to lose shelf stability and a coat thereof becomes so hygroscopic as to develop defects in a water-resistant test. The total of constants Es of $R^6$, $R^7$, $R^8$ and $R^9$ is preferably not lower than −3.2, and more preferably not lower than −2.8.

In the above formula, $R^6$, $R^7$, $R^8$ and $R^9$ are optionally halogenated alkyl groups of 1 to 18 carbon atoms, preferably 1 to 12 carbon atoms, for example, alkyl groups such as methyl, ethyl, propyl, butyl, pentyl, hexyl, heptyl, and octyl; cycloalkyl groups such as cyclopentyl and cyclohexyl; and halo-alkyl groups such as chloromethyl, γ-chloropropyl and 3,3,3-trifluoropropyl.

M is an ammonium or phosphonium cation. $X^-$ is a halide anion, hydroxide anion or $C_1$-$C_4$ carboxylate anion, and preferably a hydroxide anion or acetate anion.

Illustrative examples of the curing catalyst having formula (3) include, but are not limited to, hydroxides such as tetra-n-propylammonium hydroxide, tetra-n-butylammonium hydroxide, tetra-n-pentylammonium hydroxide, tetra-n-hexylammonium hydroxide, tetracyclohexylammonium hydroxide, tetrakis(trifluoromethyl)ammonium hydroxide, trimethylcyclohexylammonium hydroxide, trimethyl(trifluoromethyl)ammonium hydroxide, trimethyl-t-butylammonium hydroxide, tetra-n-propylphosphonium hydroxide, tetra-n-butylphosphonium hydroxide, tetra-n-pentylphosphonium hydroxide, tetra-n-hexylphosphonium hydroxide, tetracyclohexylphosphonium hydroxide, tetrakis(trifluoromethyl)phosphonium hydroxide, trimethylcyclohexylphosphonium hydroxide, trimethyl(trifluoromethyl)phosphonium hydroxide, and trimethyl-t-butylphosphonium hydroxide; salts of the foregoing hydroxides with halogenic acids and with $C_1$-$C_4$ carboxylic acids. Inter alia, tetrapropylammonium hydroxide, tetrapropylammonium acetate, tetrabutylammonium hydroxide, tetrabutylammonium acetate, tetrabutylphosphonium hydroxide, and tetrabutylphosphonium acetate are preferred. These may be used alone or in admixture of two or more, or in combination with any of the aforementioned well-known curing catalysts.

Insofar as component (C) is compounded in an effective amount to cure the hydrolytic condensate (A), the amount of the catalyst is not particularly limited. Specifically the curing catalyst is preferably used in an amount of 0.0001 to 30% by weight, more preferably 0.001 to 10% by weight, based on the solids of components (A) and (B). Less than 0.0001 wt % of the catalyst may lead to under-cure and low hardness. More than 30 wt % of the catalyst may lead to a coating which is prone to crack and poorly water resistant.

Component E

Component (E) is a solvent. The solvent is not particularly limited as long as components (A) to (D) are dissolvable or dispersible therein. A solvent mainly comprising a highly polar organic solvent is preferred. Exemplary solvents include alcohols such as methanol, ethanol, isopropyl alcohol, n-butanol, isobutanol, t-butanol, and diacetone alcohol; ketones such as methyl propyl ketone, diethyl ketone, methyl isobutyl ketone, cyclohexanone, and diacetone alcohol; ethers such as dipropyl ether, dibutyl ether, anisole, dioxane, ethylene glycol monoethyl ether, ethylene glycol monobutyl ether, propylene glycol monomethyl ether, and propylene glycol monomethyl ether acetate; and esters such as ethyl acetate, propyl acetate, butyl acetate, and cyclohexyl acetate. The solvents may be used alone or in admixture.

Component (E) is preferably added in such an amount that the silicone coating composition may have a solids concentration of 1 to 30% by weight, more preferably 5 to 25% by weight. Outside the range, a coating obtained by applying the composition and curing may be defective. A concentration below the range may lead to a coating which is likely to sag, wrinkle or mottle, failing to provide the desired hardness and mar resistance. A concentration beyond the range may lead to a coating which is susceptible to brushing, whitening or cracking.

Component F

Component (F) is a ultraviolet (UV) absorber. Inclusion of a UV absorber is effective for preventing a cured coating of the coating composition on an organic resin substrate from yellowing and surface degradation. Preferred are those UV absorbers which are compatible or dispersible in the silicone coating composition and less volatile.

Suitable UV absorbers include nanoparticulate inorganic oxides having a UV shielding effect and organic UV absorbers. Examples of the nanoparticulate inorganic oxides having a UV shielding effect include zinc oxide, titanium oxide, cerium oxide, and zirconium oxide, with those oxides having controlled photocatalytic activity being preferred. Also useful are metal chelate compounds of titanium, zinc, zirconium, etc. and (partial) hydrolyzates and condensates thereof.

Among others, composite zinc oxide or titanium oxide nanoparticles obtained by coating surfaces of zinc oxide or titanium oxide nanoparticles with at least one member selected from the group consisting of oxides and hydroxides of Al, Si, Zr and Sn are preferred as component (F). The composite zinc or titanium oxide nanoparticles should preferably have a photocatalytic degradability of up to 25%, more preferably up to 23%. As used herein, the photocatalytic degradability (PD) may be evaluated by measuring a change of absorbance by photodegradation of methylene blue. Specifically, 0.15 g calculated as composite oxide nanoparticle solids of the composite oxide nanoparticle dispersion is added to 20 g of a methylene blue solution in water/methanol (1:1 weight ratio) having a methylene blue concentration of 0.01 mmol/L. The solution is stirred in the dark for 30 minutes, and then irradiated with black light at a power of 15 W for 12 hours. Thereafter, the solution was centrifuged at 3,000 rpm for 15 minutes to collect the supernatant, and the absorbance of methylene blue at 653 nm is measured by a UV/visible spectrophotometer. A photocatalytic degradability (PD) is computed from the absorbances before and after the black light irradiation according to the following formula:

$$PD(\%)=[(A0-A)/A0]\times 100$$

wherein A0 is the initial absorbance and A is the absorbance after the black light irradiation.

More preferably, composite zinc or titanium oxide nanoparticles are obtained by heating a zinc or titanium source in a DC arc plasma for vaporization, oxidizing the zinc or titanium vapor, cooling, thus forming zinc or titanium oxide nanoparticles, and coating surfaces of the nanoparticles with at least one member selected from oxides and hydroxides of Al, Si, Zr and Sn. The resulting composite zinc or titanium oxide nanoparticles are then dispersed in a dispersing medium to yield a composite zinc or titanium oxide nanoparticle dispersion.

In general, zinc or titanium oxide nanoparticles have a UV shielding function and a photocatalyst function at the same time. If such zinc or titanium oxide nanoparticles are used as a UV shielding agent in a hard coat composition, their photocatalyst function can degrade the binder so that the hard coat may develop cracks. By contrast, the composite zinc or titanium oxide nanoparticles having a very low photocatalytic activity minimize crack formation.

It is noted that component (F) used herein is commercially available, for example, as ZNTAB 15 wt %-E16, E15, E16-(1), and E16-(2) and RTTDNB 15 wt %-E40, E66, E67, and E68 by C.I. Kasei Co., Ltd.

Further preferred organic UV absorbers include derivatives of compounds having hydroxybenzophenone, benzotriazole, cyanoacrylate and triazine as a main skeleton. Also included are polymers such as vinyl polymers having the UV absorber incorporated in a side chain and copolymers thereof with another vinyl monomer, and silyl-modified UV absorbers, and (partial) hydrolytic condensates thereof.

Exemplary UV absorbers include 2,4-dihydroxybenzophenone, 2,2',4,4'-tetrahydroxybenzophenone, 2-hydroxy-4-methoxybenzophenone, 2-hydroxy-4-methoxybenzophenone-5-sulfonic acid, 2-hydroxy-4-n-octoxybenzophenone, 2-hydroxy-4-n-dodecyloxybenzophenone, 2-hydroxy-4-n-benzyloxybenzophenone, 2,2'-dihydroxy-4,4'-dimethoxybenzophenone, 2,2'-dihydroxy-4,4'-diethoxybenzophenone, 2,2'-dihydroxy-4,4'-dipropoxybenzophenone, 2,2'-dihydroxy-4,4'-dibutoxybenzophenone, 2,2'-dihydroxy-4-methoxy-4'-propoxybenzophenone, 2,2'-dihydroxy-4-methoxy-4'-butoxybenzophenone, 2,3,4-trihydroxybenzophenone, 2-(2-hydroxy-5-t-methylphenyl)benzotriazole, 2-(2-hydroxy-5-t-octylphenyl)benzotriazole, 2-(2-hydroxy-3,5-di-t-butylphenyl)benzotriazole, ethyl-2-cyano-3,3-diphenyl acrylate, 2-ethylhexyl-2-cyano-3,3'-diphenyl acrylate, 2-(2-hydroxy-4-hexyloxyphenyl)-4,6-diphenyltriazine, (co)polymers of 2-hydroxy-4-(2-acryloxyethoxy)benzophenone, (co)polymers of 2-(2'-hydroxy-5'-methacryloxyethylphenyl)-2H-benzotriazole,
the reaction product of 2,4-dihydroxybenzophenone with γ-glycidoxypropyltrimethoxysilane,
the reaction product of 2,2',4,4'-tetrahydroxybenzophenone with γ-glycidoxypropyltrimethoxysilane, and (partial) hydrolyzates thereof. These organic UV absorbers may be used alone or in admixture.

The UV absorber is preferably compounded in an amount of 0 to 100% by weight, and when used, in an amount of more preferably 0.3 to 100%, even more preferably 0.3 to 30% by weight based on the solids in the silicone coating composition.

If desired, suitable additives may be added to the silicone coating composition insofar as this does not adversely affect the invention. Suitable additives include pH adjustors, leveling agents, thickeners, pigments, dyes, metal oxide nanoparticles, metal powder, antioxidants, UV stabilizers, heat ray reflecting/absorbing agents, plasticizers, antistatic agents, anti-staining agents, and water repellents.

For enhanced storage stability, the silicone coating composition may preferably be adjusted to pH 2 to 7, more preferably pH 3 to 6. Since a pH value outside the range may lessen storage stability, a pH adjustor may be added so that the pH falls in the range. For a silicone coating composition having a pH value outside the range, if the pH is more acidic than the range, a basic compound such as ammonia or ethylene diamine may be added for pH adjustment. If the pH is more basic than the range, an acidic compound such as hydrochloric acid, nitric acid, acetic acid or citric acid may be added for pH adjustment. The pH adjustment method is not particularly limited.

Preferred as the UV stabilizer are compounds having at least one cyclic hindered amine structure in a molecule, which are compatible with the silicone coating composition and low volatile. Exemplary UV stabilizers include 3-dodecyl-1-(2,2,6,6-tetramethyl-4-piperidinyl)pyrrolidine-2,5-dione, N-methyl-3-dodecyl-1-(2,2,6,6-tetramethyl-4-piperidinyl)-pyrrolidine-2,5-dione, N-acetyl-3-dodecyl-1-(2,2,6,6-tetramethyl-4-piperidinyl)-pyrrolidine-2,5-dione, bis(2,2,6,6-tetramethyl-4-piperidyl) sebacate, bis(1,2,2,6,6-pentamethyl-4-piperidyl) sebacate, tetrakis(2,2,6,6-tetramethyl-4-piperidyl) 1,2,3,4-butane-tetracarboxylate, tetrakis(1,2,2,6,6-pentamethyl-4-piperidyl) 1,2,3,4-butane-tetracarboxylate, the condensate of 1,2,3,4-butanetetracarboxylic acid, 2,2,6,6-tetramethyl-4-piperidinol and tridecanol, 8-acetyl-3-dodecyl-7,7,9,9-tetramethyl-1,3,8-triazaspiro-[4,5]decane-2,4-dione, the condensate of 1,2,3,4-butanetetracarboxylic acid, 1,2,6,6-pentamethyl-4-piperidinol and β,β,β,β'-tetramethyl-3,9-(2,4,8,10-tetraoxaspiro[5,5]undecane)diethanol, and the condensate of 1,2,3,4-butanetetracarboxylic acid, 2,2,6,6-pentamethyl-4-piperidinol and β,β,β,β'-tetramethyl-3,9-(2,4,8,10-tetraoxaspiro[5,5]undecane)diethanol.

Also useful are photostabilizers which are modified by silylation for the purpose of anchoring the photostabilizers as described in JP-B S61-56187, for example, 2,2,6,6-tetramethylpiperidino-4-propyltrimethoxysilane, 2,2,6,6-tetramethylpiperidino-4-propylmethyldimethoxysilane, 2,2,6,6-tetramethylpiperidino-4-propyltriethoxysilane, 2,2,6,6-tetramethylpiperidino-4-propylmethyldiethoxysilane, and (partial) hydrolyzates thereof. These photostabilizers may be used in admixture of two or more.

The UV stabilizer is preferably compounded in an amount of 0 to 10% by weight, and when used, in an amount of more preferably 0.03 to 10%, even more preferably 0.03 to 7.5% by weight based on the solids in the silicone coating composition.

The silicone coating composition may be obtained by mixing selected amounts of the respective components in a standard manner.

The silicone coating composition may be applied to at least one surface of a substrate directly or via another layer or layers. It is then cured to yield a coated article. The silicone coating composition may be applied to the substrate by any ordinary coating techniques. Suitable coating techniques include brush coating, spray coating, dipping, flow coating, roll coating, curtain coating, spin coating, and knife coating.

The substrate used herein is not particularly limited and includes molded plastics, wood items, ceramics, glass, metals, and composites thereof. Of these, plastic materials or organic resin substrates are preferred. Examples include polycarbonate, polystyrene, acrylic resins, modified acrylic resins, urethane resins, thiourethane resins, polycondensates of halogenated bisphenol A and ethylene glycol, acrylic urethane resins, halogenated aryl-containing acrylic resins, and sulfur-containing resins. These resin substrates which have been surface treated, specifically by conversion treatment, corona discharge treatment, plasma treatment, acid or alkaline treatment are also useful. Also included are laminated substrates comprising a resin substrate and a surface layer formed thereon from a resin of different type from the substrate. Exemplary laminated substrates include those consisting of a polycarbonate resin substrate and a surface layer of acrylic resin or urethane resin which are prepared by co-extrusion or lamination technique, and those consisting of a polyester resin substrate and a surface layer of acrylic resin formed thereon.

After the silicone coating composition is applied, the coating may be air dried or heated to form a cured film. The curing temperature and time are not particularly limited although the coating is preferably heated at a temperature below the heat resistant temperature of the substrate for 10 minutes to 2 hours. More preferably the coating is heated at a temperature of 80 to 135° C. for 30 minutes to 2 hours.

The thickness of the cured film is not particularly limited and may be selected as appropriate for a particular application. The cured film preferably has a thickness of 0.1 to 50 μm, and more preferably in the range of 1 to 20 μm for ensuring that the cured film has hardness, mar resistance, long-term stable adhesion and crack resistance.

The silicone coating composition of the invention is characterized by tight adhesion when applied to an organic resin substrate without a primer. An index of adhesion is given by examining whether or not the coating peels in a boiling adhesion test. The test involves applying and curing the composition to an organic resin substrate without a primer, immersing the coated substrate in boiling water for 10 hours, scribing the coating with a cutter to define 25 sections of 2 mm square, attaching commercial adhesive tape (Cellotape®, Nichiban Co., Ltd.) to the coating, and pulling the adhesive tape. The silicone coating composition of the invention shows no peel in this test.

The silicone coating composition is also characterized by visible light transmittance in coating form. An index of visible light transmittance is the haze of a film. In general, the haze increases as the film becomes thicker. The film having a thickness of up to 5 μm preferably meets a haze of up to 2.0, more preferably up to 1.5, and even more preferably up to 1.0. The haze is measured by a haze meter NDH2000 (Nippon Denshoku Industries Co., Ltd.).

The silicone coating composition is further characterized by mar resistance in coating form. An index of mar resistance is a delta haze value (ΔHz) in the Taber abrasion test. Specifically, a ΔHz value is determined according to ASTM D1044 by mounting a Taber abrasion tester with abrasion wheels SC-10F, measuring the haze after 500 turns under a load of 500 g, and calculating a difference (ΔHz) between haze values before and after the test. The film having a thickness of up to 5 μm preferably has ΔHz of up to 10.0, more preferably up to 8.0, and even more preferably up to 5.0.

The silicone coating composition may be applied to the surface of a resin substrate directly or via another layer or layers. Suitable intervening layers include a primer layer, UV-absorbing layer, printing layer, recording layer, heat-ray shielding layer, adhesive layer, inorganic vapor-deposited layer and the like.

The primer layer is preferably formed of acrylic resin primers, and more preferably primers based on vinyl copolymers having organic UV-absorptive groups and alkoxysilyl groups on side chains. Such primers are exemplified in JP 4041968, JP-A 2008-120986, and JP-A 2008-274177.

In the vinyl copolymer having an organic UV-absorptive group and an alkoxysilyl group bonded to side chains, preferably the alkoxysilyl group is bonded to the vinyl copolymer backbone via a Si—C bond, and more preferably the organic UV-absorptive group is also bonded to the vinyl copolymer backbone. Such copolymers may be obtained from copolymerization of monomeric components: (a) a vinyl monomer having an alkoxysilyl group bonded thereto via a Si—C bond, (b) a vinyl monomer having an organic UV-absorptive group, and (c) another monomer copolymerizable therewith.

In addition to the vinyl copolymer having organic UV-absorptive groups and alkoxysilyl groups on side chains, the primer composition may preferably comprise colloidal silica dispersed in an organic solvent. Suitable organic solvents include methanol, ethanol, isopropanol, n-butanol, ethylene glycol, ethyl cellosolve, butyl cellosolve, propylene glycol monomethyl ether, propylene glycol monomethyl ether acetate (PGMEA), dimethylformamide, dimethylacetamide, methyl ethyl ketone, methyl isobutyl ketone, and xylene/n-butanol mixtures. Of these, ethylene glycol, ethyl cellosolve, butyl cellosolve, propylene glycol monomethyl ether, PGMEA, methyl ethyl ketone, and methyl isobutyl ketone are preferred when the solubility of the vinyl copolymer is taken into account.

A coated article may be produced by applying a primer to an organic resin substrate, applying the silicone coating composition on the primer layer, and curing the silicone coating. This coated article has a higher degree of weather resistance because of the synergy of the UV-shielding ability of the silicone coating combined with organic UV-absorptive groups in the primer layer.

EXAMPLE

Synthesis Examples, Examples and Comparative Examples are given below by way of illustration and not by way of limitation. Unless otherwise stated, all parts and percents are by weight. The viscosity is as measured at 25° C. according to JIS Z8803. Mw and Mn are determined by GPC versus polystyrene standards, and a polydispersity index (Mw/Mn) is calculated therefrom.

Synthesis of Mixture of (A) Hydrolytic Condensate, (B) Colloidal Silica, and (C) Curing Catalyst Synthesis Example 1

A 2-L flask was charged with 287 g (2.11 Si-mol) of methyltrimethoxysilane and cooled to a fluid temperature of about 10° C. Then 211 g of Snowtex O (Nissan Chemical Industries, Ltd., water-dispersed silica sol, average particle size 15-20 nm, $SiO_2$ content 20%) and 93 g of 0.25N acetic acid aqueous solution were added dropwise while the flask was cooled so that the internal temperature might not exceed 40° C., allowing hydrolysis to run. Following the dropwise addition, the solution was stirred below 40° C. for one hour and then at 60° C. for 3 hours to bring hydrolysis to completion.

Thereafter, 300 g of cyclohexanone was poured to the reaction mixture, which was heated under atmospheric pressure until the liquid temperature reached 92° C., for distilling off the methanol resulting from hydrolysis and allowing condensation to run. To the reaction mixture were added 400 g of isopropanol as a diluent, 0.5 g of leveling agent KP-341 (Shin-Etsu Chemical Co., Ltd.), 1.6 g of acetic acid, and 1.6 g of 25% tetrabutylammonium hydroxide (TBAH) aqueous solution. The mixture was stirred and filtered through a paper filter, yielding a colorless clear hydrolytic condensate solution (ABD-1) having a nonvolatile concentration of 19.2%, a Mw of 2,510, and a polydispersity index of 1.84.

Synthesis Example 2

A 2-L flask was charged with 321 g (2.36 Si-mol) of methyltrimethoxysilane, 21 g (0.13 Si-mol) of 3,3,3-trifluoropropyltrimethoxysilane and 56 g (0.33 Si-mol) of Silicate 35 (Tama Chemicals Co., Ltd., partial hydrolytic condensate of tetraethoxysilane, dimer on average), which were thoroughly mixed. The flask was cooled to a fluid temperature of about 10° C. Then 308 g of 0.25N acetic acid aqueous solution was added dropwise while the flask was cooled so that the internal temperature might not exceed 40° C., allowing hydrolysis to run. Following the dropwise addition, the solution was stirred below 40° C. for one hour and then at 60° C. for 3 hours to bring hydrolysis to completion.

Thereafter, 300 g of PGMEA was poured to the reaction mixture, which was heated under atmospheric pressure until the liquid temperature reached 92° C., for distilling off the methanol and ethanol resulting from hydrolysis and allowing condensation to run. To the reaction mixture were added 50 g of IPA-ST (Nissan Chemical Industries, Ltd., isopropanol-dispersed silica sol, average particle size 10-15 nm, $SiO_2$ content 30%) as a diluent, 350 g of isobutanol, 0.5 g of leveling agent KP-341 (Shin-Etsu Chemical Co., Ltd.), and 134 g of 0.25% tetramethylammonium hydroxide (TMAH) aqueous solution. The mixture was stirred and filtered through a paper filter, yielding a colorless clear hydrolytic condensate solution (ABD-2) having a nonvolatile concentration of 19.5%, a Mw of 3,180, and a polydispersity index of 1.96.

Synthesis Example 3

A 2-L flask was charged with 259 g (1.90 Si-mol) of methyltrimethoxysilane and 43 g (0.21 Si-mol) of isocyanurate silane X-12-965 (Shin-Etsu Chemical Co., Ltd., tris(3-trimethoxysilylpropyl)isocyanurate), which were thoroughly mixed. The flask was cooled to a fluid temperature of about 10° C. Then 211 g of Snowtex O (Nissan Chemical Industries, Ltd., water-dispersed silica sol, average particle size 15-20 nm, $SiO_2$ content 20%) and 93 g of 0.25N acetic acid aqueous solution were added dropwise while the flask was cooled so that the internal temperature might not exceed 40° C., allowing hydrolysis to run. Following the dropwise addition, the solution was stirred below 40° C. for one hour and then at 60° C. for 3 hours to bring hydrolysis to completion.

Thereafter, 300 g of cyclohexanone was poured to the reaction mixture, which was heated under atmospheric pressure until the liquid temperature reached 92° C., for distilling off the methanol resulting from hydrolysis and allowing condensation to run. To the reaction mixture were added 400 g of isopropanol as a diluent, 0.5 g of leveling agent KP-341 (Shin-Etsu Chemical Co., Ltd.), 1.6 g of acetic acid, and 1.6 g of 25% tetramethylammonium hydroxide (TMAH) aqueous solution. The mixture was stirred and filtered through a paper filter, yielding a colorless clear hydrolytic condensate solution (ABD-3) having a nonvolatile concentration of 21.3%, a Mw of 5,490, and a polydispersity index of 2.90.

[(C) Polycarbonate or Polyester Base Urethane-Modified Vinyl Polymer]

C-1: Acrit 8UA-347 (by Taisei Fine Chemical Co., Ltd., polycarbonate base urethane-modified vinyl polymer emulsion, solid concentration 30%, solid hydroxyl number 103, Mw 20,200), diluted with diacetone alcohol to a solid concentration of 20%

C-2: Acrit 8UA-366 (by Taisei Fine Chemical Co., Ltd., polycarbonate base urethane-modified vinyl polymer emulsion, solid concentration 35%, solid hydroxyl number 90, Mw 18,800), diluted with diacetone alcohol to a solid concentration of 20%

C-3: Acrit 8UA-301 (by Taisei Fine Chemical Co., Ltd., polyester base urethane-modified vinyl polymer emulsion, solid concentration 30%, solid hydroxyl number 35, Mw 40,300), diluted with diacetone alcohol to a solid concentration of 20%

Synthesis of (A-1) Siloxane Resin

Synthesis Example 4

A 2-L three-necked flask equipped with a thermometer, stirrer and condenser was charged with 408 g of methyltrimethoxysilane and 400 g of toluene, and further with 11 g of 98% methanesulfonic acid as a catalyst. With the internal temperature kept below 30° C., 146 g of water was added dropwise whereby methyltrimethoxysilane was hydrolyzed. After the completion of dropwise addition, stirring was continued for 2 hours at room temperature to drive the reaction to completion. Then the acidic component was neutralized, and the methanol formed was distilled off in vacuum. After the salt of neutralization was removed by washing with water twice, vacuum distillation was performed again to remove the solvents including toluene until the weight loss on 105° C./3 hour drying reached 1.1%. There was obtained 210 g of a siloxane resin as colorless transparent solid. The resin had a Mw of 7,500. On $^{29}$Si-NMR and IR spectroscopy analysis, the resin was identified to have the average compositional formula (5).

$$(CH_3)_{1.0}Si(OMe)_{0.06}(OH)_{0.12}O_{0.41} \quad (5)$$

Note that Me stands for methyl.

The transparent solid resin had a softening point of 73° C. as measured by a ring-and-ball automatic softening point tester according to JIS K-2207.

The siloxane resin, 200 g, was dissolved in 800 g of isopropanol to give a siloxane resin solution A-1 having a solid concentration of 20%.

[(F) UV Absorber]

F-1: RTTDNB 15 wt %-E68 by C.I. Kasei Co., Ltd. dispersion of composite titanium oxide nanoparticles obtained by forming titanium oxide nanoparticles by DC arc plasma technique, coating with silica, surface treating with methyltrimethoxysilane, and dispersing in an alcohol mixture with the aid of a dispersant; solids concentration 15%, average particle size (volume average particle size $D_{50}$) 105 nm as measured by Nanotrac UPA-EX150 (Nikkiso Co., Ltd.), PD 19%

It is noted that PD is a photocatalytic degradability computed according to the formula:

PD(%)=[(A0−A)/A0]×100 wherein A0 is the initial absorbance and A is the absorbance after the black light irradiation.

F-2: Hostavin PR-25 (malonic acid ester organic UV absorber) by Clariant

Synthesis of Primer Based on Vinyl Polymer having Organic UV-Absorptive Group and Alkoxysilyl Group Bonded to Side Chains Synthesis Example 5

A 2-L flask equipped with a stirrer, condenser and thermometer was charged with 152 g of diacetone alcohol, which was heated at 80° C. under a nitrogen stream. A monomer mix solution was previously prepared by mixing 67.5 g of 2-[2'-hydroxy-5'-(2-methacryloxyethyl)phenyl]-2H-benzotriazole (RUVA-93, Otsuka Chemical Co., Ltd.), 90 g of γ-methacryloxypropyltrimethoxysilane, 270 g of methyl methacrylate, 22.5 g of glycidyl methacrylate, and 350 g of diacetone alcohol. An initiator solution was previously prepared by dissolving 2.3 g of 2,2'-azobis(2-methylbutyro-nitrile) as a polymerization initiator in 177.7 g of diacetone alcohol. A 240 g portion of the monomer mix solution and a 54 g portion of the initiator solution were sequentially admitted into the flask, which was heated at 80° C. for 30 minutes, allowing reaction to run. The remainder of the monomer mix solution and the remainder of the initiator solution were concurrently added dropwise at 80-90° C. over 1.5 hours, followed by stirring at 80-90° C. for 5 hours.

The resulting vinyl polymer having organic UV absorptive group and trimethoxysilyl group bonded to side chains had a viscosity of 5,050 mPa·s, and this copolymer contained 15% of the UV absorbing monomer and 20% of the vinyl monomer having a trimethoxysilyl group bonded to a side chain via a C—Si bond. The polymer had a Mw of 60,800 as measured by GPC.

To 100 parts of the resulting vinyl polymer was added 23 parts of colloidal silica dispersed in PGMEA (PMA-ST, Nissan Chemical Industries Co., Ltd., solids concentration 30%, primary particle size 10-15 nm). The mixture was diluted with 110 parts of a solvent mixture of diacetone alcohol and propylene glycol monomethyl ether in a weight ratio 1/1, thoroughly stirred, and filtered through a paper filter, yielding a colorless clear primer composition (P-1) having a nonvolatile concentration of 20.4%.

Preparation of Silicone Coating Composition and Evaluation of Cured Film

Example 1

A silicone coating composition #1 was prepared by adding 5 parts of polycarbonate base urethane-modified vinyl polymer solution (C-1) to 100 parts of the hydrolytic condensate solution (ABD-1) in Synthesis Example 1 and mixing them.

Examples 2 to 5 and Comparative Examples 1 to 5

Silicone coating compositions #2 to #10 were prepared by mixing the components in suitable amounts as shown in Tables 1 and 2.

Example 6

Primer composition (P-1) in Synthesis Example 5 was flow coated onto a cleaned surface of a 5-mm polycarbonate resin sheet (Iupilon, Mitsubishi Engineering-Plastics Corp.) and heat cured at 130° C. for 45 minutes to form a primer layer of about 6-8 μm thick. Onto the primer layer, the coating composition #1 of Example 1 was flow coated and heat cured at 130° C. for 60 minutes to form a silicone coating of about 3-5 μm thick. The multilayer coated samples (having primer and silicone layers on PC) were measured for physical properties, with the results shown in Table 3.

Examples 7 to 11

Each of the coating compositions #1 to #5 was flow coated directly (i.e., without primer composition (P-1)) onto a cleaned surface of a 5-mm polycarbonate resin sheet (Iupilon, Mitsubishi Engineering-Plastics Corp.) and heat cured at 130° C. for 60 minutes to form a silicone coating of about 3-5 μm thick. The coated samples (having silicone layer on PC) were measured for physical properties, with the results shown in Table 3.

Comparative Examples 6 to 10

As in Example 7, each of the coating compositions #6 to #10 was coated and cured to a PC sheet. The coated samples were measured for physical properties, with the results shown in Table 4.

It is noted that among the abbreviations shown in Tables 1 and 2, those abbreviations not described in Synthesis Examples have the following meaning.

[Additives]
- G-1: hindered amine photostabilizer N-acetyl-3-dodecyl-1-(2,2,6,6-tetramethyl-4-piperidinyl)pyrrolidine-2,5-dione (Sandbar 3058Liq, Clariant)
- G-2: hydrolytic condensate of metal chelate methanol solution of hydrolytic condensate obtained by reacting titanium tetraisopropoxide with acetylacetone, and hydrolyzing with aqueous ammonia, having a solid concentration of 20%
- H-1: hydroxyl-containing (meth)acrylic resin diacetone alcohol solution of a hydroxyl-containing methacrylic resin obtained by radical polymerization of methyl methacrylate, butyl methacrylate and 2-hydroxyethyl methacrylate (80/5/15%), Mw=35,200, solid concentration of 40%
- H-2: conventional adhesion promoter 2-hydroxyethyl acrylate
- H-3: conventional adhesion promoter acrylated polyurethane (Ebecryl 4827, Daicel UBC)

[Tests of Cured Film]

Mar Resistance

Mar resistance was analyzed according to ASTM D1044 by mounting a Taber abrasion tester with wheels CS-10F, measuring a haze after 500 turns under a load of 500 g, and calculating a haze difference ($\Delta$Hz) before and after the test.

Initial Adhesion

Adhesion was analyzed by a cross-hatch adhesion test according to JIS K5400, specifically by scribing the sample with a razor along 6 longitudinal and 6 transverse lines at a spacing of 2 mm to define 25 square sections, tightly attaching adhesive tape (Cellotape® by Nichiban Co., Ltd.) thereto, rapidly pulling back the adhesive tape at an angle of 90°, and counting the number (X) of coating sections kept unpeeled. The result is expressed as X/25.

Appearance and Adhesion after Boiling

The sample was immersed in boiling water for 2 hours, before its outer appearance was visually examined. After immersion for 2, 6 and 10 hours, the same adhesion test as above was carried out.

Weather Resistance

A weathering test was carried out by Eyesuper UV tester W-151 (Iwasaki Electric Co., Ltd.) which operated one cycle of [black panel temperature 63° C., humidity 50% RH, illuminance 50 mW/cm$^2$, raining intervals of 10 sec/hour for 5 hours] and [black panel temperature 30° C., humidity 95% RH for one hour]. The test was continued for 100 hours and 250 hours. A yellowing index (YI) was measured according to JIS K7103 before and after the test, from which a change of yellowing index ($\Delta$YI) was computed. The weathered sample was also examined for cracks and delamination with naked eyes or under a microscope (×250 magnifying power).

Crack

The coating appearance after the weathering test was rated according to the following criterion.
- ○: intact
- Δ: some cracks
- X: cracks on entire coating Delamination The coating after the weathering test was rated according to the following criterion.
- ○: intact
- Δ: some delamination between silicone coating and substrate
- X: overall delamination between silicone coating and substrate

TABLE 1

Coating composition (as solids)

| Formulation (pbw) | Example | | | | |
|---|---|---|---|---|---|
| | 1 | 2 | 3 | 4 | 5 |
| Composition | #1 | #2 | #3 | #4 | #5 |
| Hydrolytic condensate solution (ABD) | ABD-1 100 pbw | ABD-1 90 pbw | ABD-1 100 pbw | ABD-2 100 pbw | ABD-3 85 pbw |
| Siloxane resin solution (A-1) | | A-1 10 pbw | | | A-1 15 pbw |
| Total | 100 pbw | 100 pbw | 100 pbw | 100 pbw | 100 pbw |
| Urethane-modified vinyl polymer (C) | C-1 5 pbw | C-2 10 pbw | C-3 25 pbw | C-1 5 pbw | C-1 15 pbw |
| UV absorber (F) | | | | F-1 4 pbw | F-2 15 pbw |
| Additive | | | | G-2 0.8 pbw | G-1 0.5 pbw |

TABLE 2

Coating composition (as solids)

| Formulation (pbw) | Comparative Example | | | | |
|---|---|---|---|---|---|
| | 1 | 2 | 3 | 4 | 5 |
| Composition | #6 | #7 | #8 | #9 | #10 |
| Hydrolytic condensate solution (ABD) | ABD-1 100 pbw | ABD-3 100 pbw | ABD-1 100 pbw | ABD-1 100 pbw | ABD-2 100 pbw |
| Siloxane resin solution (A-1) | | | | | |
| Total | 100 pbw | 100 pbw | 100 pbw | 100 pbw | 100 pbw |
| Urethane-modified vinyl polymer (C) | | C-2 60 pbw | | | |
| UV absorber (F) | | | | | |
| Additive | | H-1 5 pbw | H-2 5 pbw | H-3 5 pbw | |

TABLE 3

Tested properties of coatings

| | Example | | | | | |
|---|---|---|---|---|---|---|
| | 6 | 7 | 8 | 9 | 10 | 11 |
| Primer | P-1 | — | — | — | — | — |
| Coating composition | #1 | #1 | #2 | #3 | #4 | #5 |
| Test results | | | | | | |
| Coating transparency Hz | 0.2 | 0.2 | 0.3 | 0.5 | 0.9 | 0.3 |
| Mar resistance ΔHz | 4.3 | 3.3 | 6.3 | 4.9 | 4.2 | 5.8 |
| Initial adhesion | 25/25 | 25/25 | 25/25 | 25/25 | 25/25 | 25/25 |
| Appearance after 2 hr boiling | intact | intact | intact | intact | intact | intact |
| Adhesion after 2 hr boiling | 25/25 | 25/25 | 25/25 | 25/25 | 25/25 | 25/25 |
| Adhesion after 6 hr boiling | 25/25 | 25/25 | 25/25 | 25/25 | 25/25 | 25/25 |
| Adhesion after 10 hr boiling | 25/25 | 25/25 | 25/25 | 25/25 | 25/25 | 25/25 |
| Weathering ΔYI | <1 | 2 | 3 | 3 | 1 | 1 |

TABLE 3-continued

Tested properties of coatings

| | Example | | | | | |
|---|---|---|---|---|---|---|
| | 6 | 7 | 8 | 9 | 10 | 11 |
| test 100 hr Crack | ○ | ○ | ○ | ○ | ○ | ○ |
| Delamination | ○ | ○ | ○ | ○ | ○ | ○ |
| Weathering ΔYI | 2 | 8 | 9 | 7 | 1 | 3 |
| test 250 hr Crack | ○ | ○ | ○ | ○ | ○ | ○ |
| Delamination | ○ | Δ | Δ | ○ | ○ | ○ |

TABLE 4

Tested properties of coatings

| | Comparative Example | | | | |
|---|---|---|---|---|---|
| | 6 | 7 | 8 | 9 | 10 |
| Primer | — | — | — | — | — |
| Coating composition | #6 | #7 | #8 | #9 | #10 |
| Test results | | | | | |
| Coating transparency Hz | 0.1 | 0.7 | 0.4 | 0.5 | 0.3 |
| Mar resistance ΔHz | 2.9 | 13.3 | 6.3 | 7.9 | 5.4 |
| Initial adhesion | 10/25 | 25/25 | 25/25 | 25/25 | 25/25 |
| Appearance after 2 hr boiling | intact | intact | whitened | intact | intact |
| Adhesion after 2 hr boiling | 0/25 | 25/25 | 0/25 | 0/25 | 25/25 |
| Adhesion after 6 hr boiling | — | 0/25 | — | — | 5/25 |
| Adhesion after 10 hr boiling | — | — | — | — | 0/25 |
| Weathering test ΔYI 100 hr | 11 | 9 | 8 | 15 | 13 |
| Crack | ○ | ○ | ○ | ○ | ○ |
| Delamination | X | X | X | X | X |
| Weathering test ΔYI 250 hr | — | — | — | — | — |
| Crack | — | — | — | — | — |
| Delamination | — | — | — | — | — |

Japanese Patent Application No. 2009-184597 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. An abrasion resistant silicone coating composition comprising (A) a hydrolytic condensate obtained by subjecting at least one compound selected from alkoxysilanes having the general formula (1) and partial hydrolytic condensates of the alkoxysilanes having the general formula (1) to (co)hydrolytic condensation, $$R^1_m R^2_n Si(OR^3)_{4-m-n} \quad (1)$$

wherein $R^1$ and $R^2$ are each independently hydrogen or a substituted or unsubstituted monovalent hydrocarbon radical, the radicals of $R^1$ and $R^2$ may bond together, $R^3$ is an alkyl radical of 1 to 3 carbon atoms, m and n are each independently 0 or 1, and m+n is 0, 1 or 2, (A-1) 1 to 50% by weight based on the weight of (A) of a siloxane resin having the average compositional formula (2):

$$R^4_a Si(OR^5)_b (OH)_c O_{(4-a-b-c)/2} \quad (2)$$

wherein $R^4$ is each independently a C1-C18 organic radical, $R^5$ is each independently a C1-C4 organic radical, a, b and c are numbers satisfying $0.8 \leq a \leq 1.5$, $0 \leq b \leq 0.3$, $0.001 \leq c \leq 0.5$, and $0.801 \leq a+b+c<2$, the siloxane resin being solid at a temperature of up to 40° C. and having a weight average molecular weight of at least 2,000 as measured by GPC,
(B) colloidal silica,
(C) a urethane-modified polycarbonate grafted to a vinyl polymer and/or a urethane-modified polyester grafted to a vinyl polymer,
(D) a curing catalyst, and
(E) a solvent, wherein
the urethane-modified vinyl polymer (C) is present in a solid content of 1 to 30% by weight based on the total solid content of the hydrolytic condensate (A) and the colloidal silica (B).

2. The composition of claim 1 wherein component (C) is a urethane-modified polycarbonate grafted to a vinyl polymer.

3. The composition of claim 1 wherein the urethane-modified polycarbonate grafted to a vinyl polymer (C) has a weight average molecular weight of 5,000 to 50,000 as measured by GPC versus polystyrene standards.

4. The composition of claim 1 wherein the urethane-modified polycarbonate grafted to a vinyl polymer (C) has a hydroxyl number of at least 10.

5. The composition of claim 1 wherein the urethane-modified polycarbonate grafted to a vinyl polymer (C) is a vinyl polymer having as a pendant a polycarbonate base urethane obtained from reaction of an aliphatic polycarbonate diol with an aromatic diisocyanate.

6. The composition of claim 1 wherein the hydrolytic condensate (A) is obtained by subjecting 100 parts by weight of at least one compound selected from alkoxysilanes of formula (1) and partial hydrolytic condensates thereof to (co)hydrolytic condensation with 50 to less than 150 parts by weight of water at pH 1 to 7, to form a hydrolytic condensate and an alcohol, and distilling off the alcohol at a liquid temperature of at least 80° C., and has a weight average molecular weight of at least 1,500 as measured by GPC versus polystyrene standards.

7. The composition of claim 1 wherein the solvent (E) is present in such an amount that the composition may have a solid concentration of 1 to 30% by weight.

8. The composition of claim 1, further comprising (F) a UV absorber.

9. The composition of claim 1, wherein (C) is a vinyl polymer having a pendant urethane-modified polycarbonate, wherein the urethane-modified polycarbonate is obtained from reaction of an aliphatic polycarbonate diol with an aromatic diisocyanate.

10. The composition of claim 1, wherein (C) is a urethane-modified polycarbonate grafted to a vinyl polymer, wherein the vinyl polymer is methyl(meth)acrylate.

11. The composition of claim 10, wherein the polycarbonate portion of the urethane-modified polycarbonate comprises polymerized units of an aliphatic polycarbonate diol.

12. The composition of claim 1 comprises hydrolyzed methyl trimethoxysilane.

13. The composition of claim 1, wherein the solid content of component (C) is 3 to 25% by weight based on the total solid content of components (A) and (B).

14. A coated article comprising an organic resin substrate and a cured coating of the silicone coating composition of claim 1 disposed on at least one surface of the substrate directly or via at least one intermediate layer.

15. The coated article of claim 14 wherein the cured coating of the composition is directly disposed on at least one surface of the substrate.

16. The coated article of claim 14 wherein the organic resin substrate is a polycarbonate.

17. A method for manufacturing a coated article comprising the steps of coating the silicone coating composition of claim 1 onto an organic resin substrate directly without a primer, and curing the composition.

* * * * *